United States Patent [19]

Mächler

[11] Patent Number: 4,709,989

[45] Date of Patent: Dec. 1, 1987

[54] CHASSIS FOR OPTICAL INSTRUMENTS

[75] Inventor: Meinrad Mächler, Ellwangen, Fed. Rep. of Germany

[73] Assignee: Carl-Zeiss-Stiftung, Heidenheim on the Brenz, Fed. Rep. of Germany

[21] Appl. No.: 779,878

[22] Filed: Sep. 25, 1985

Related U.S. Application Data

[63] Continuation-in-part of Ser. No. 478,891, Mar. 25, 1983, abandoned.

[30] Foreign Application Priority Data

Mar. 31, 1982 [DE]  Fed. Rep. of Germany ....... 3211868

[51] Int. Cl.⁴ ............................................. G02B 27/00
[52] U.S. Cl. .................... 350/321; 350/96.2; 156/89
[58] Field of Search ............... 350/320, 321, 630, 631, 350/253, 96.2; 156/89, 293

[56] References Cited

U.S. PATENT DOCUMENTS

| 3,848,973 | 11/1974 | Merz et al. | |
| 4,026,746 | 5/1977 | Straw | 156/89 |
| 4,237,474 | 12/1980 | Ladamy | 350/96.2 |
| 4,293,439 | 10/1981 | Corbett et al. | 156/89 |
| 4,384,909 | 5/1983 | Layden | 156/89 |
| 4,420,352 | 12/1983 | Schroeder et al. | 156/89 |

FOREIGN PATENT DOCUMENTS 2155269  5/1973  Fed. Rep. of Germany.

*Primary Examiner*—John K. Corbin
*Assistant Examiner*—Loha Ben
*Attorney, Agent, or Firm*—Stonebraker, Shepard & Stephens

[57] ABSTRACT

A particularly durable and thermally stable chassis (housing, frame, or body) for optical instruments is obtained by the use of compacted ceramic material. The coefficient of thermal expansion of this material can be made equal to that of the optical glass used. It is particularly favorable to develop the chassis as a three-dimensional hollow structure.

11 Claims, 5 Drawing Figures

CHASSIS FOR OPTICAL INSTRUMENTS

This application is a continuation-in-part of application Ser. No. 478,891, filed Mar. 25, 1983, now abandoned.

BACKGROUND OF THE INVENTION

The present invention relates to a chassis (i.e., a frame or body or housing) for optical instruments for the permanent, precise holding of components.

In optical instruments, the optical components (e.g. lenses, mirrors, slit members, etc.) must have precisely defined position with respect to each other. This position must be as stable as possible under the action of time and heat in order that the apparatus retains the desired properties for long periods of time and at different surrounding temperatures.

For this reason many chassis of optical instruments are made of metal. In that case, due in part to the structural development and the selection of suitable materials, the influence of temperature is reduced, but this always requires a corresponding expense. Aside from this, due to the internal stresses caused by their manufacture, metal bodies can only at great expense be brought into a condition in which high dimensional stability for long periods of time is achieved.

Recently, bodies or housings of fiberglass-reinforced plastic have become known, particularly for field glasses. The manufacture thereof is, however, expensive. Furthermore, the liberation of gasses as well as aging phenomena have not yet been clarified sufficiently for many purposes of use.

From the manufacture of large mirrors it is known to use glass-ceramic. However, it is so expensive to manufacture that the use thereof does not enter into consideration for series production, that is production in substantial volume. Recently the demands made as to the stability of optical instrument chassis or bodies over a period of time and also thermal stability have increased greatly, due to the introduction of diode arrays, also in series manufacture. In these diode arrays the individual receiver elements have dimensions of only, for instance, 25 μm. In this case the adjustment of a spectrometer which has a diode line as receiver must remain constant within fractions of 25 μm. However, better thermal stability and stability during passage of time would provide advantages also for many other instruments.

Accordingly, the object of the present invention is to create a chassis (i.e., frame or body or housing) for optical instruments which is characterized by particularly good and lasting stability, little influence by heat, and economical manufacture.

SUMMARY OF THE INVENTION

This object is achieved in accordance with the invention by making the chassis of compacted ceramic. In one advantageous embodiment, the coefficient of expansion of the ceramci is equal to that of optical glass, as a result of which the occurrence of mechanical stresses and the changes poroduced thereby is avoided. It is particularly advantageous to develop the chassis as a three-dimensional torsion-resistant hollow structure.

The chassis of the invention may be formed of a plurality of parts. The individual parts may be sintered together or connected detachably to each other, for instance by screw fastenings with one or more tie rods.

For fastening the optical components, threaded holes can be provided in the ceramic chassis. It is particularly advantageous to provide, for the fastening of optical components in the ceramic chassis, hollow spaces into which mounting parts of the optical components extend and are anchored therein by an initially pasty or liquid substance which solidifies with slight change in volume. This means of attachment by a substance which solidifies is not part of the present invention, but is described in and forms part of the subject-matter of a joint application of the present applicant and others, Ser. No. 478,892, filed Mar. 25, 1983, simultaneously with the parent application of the poresent c.i.p. application. That application Ser. No. 478,892 was based on German application No. P 32 11 867.8 of Mar. 31, 982, and has now matured as U.S. Pat. No. 4,496,416, granted Jan. 29, 1985. Another very advantageous possibility, also described in said patent, consists in providing between the optical component or its mount and the housing grooves which are filled with the solidifying substance in order to hold the optical components fast. The method also described in said patent of attaching optical components or their mounts which have an approximately flat surface to an approximately parallel surface of the housing by the solidifying substance can be advantageously employed in the case of a ceramic chassis.

In another development of the invention, the surface of the ceramic frame or parts thereof can be made electrically conductive by a glaze, thus providing screening. It is also very advantageous to provide portions of the ceramic housing with an optically strongly absorbent surface by intentional porosity and/or a dull glaze, as a result of which disturbing reflections are avoided and/or so-called stray light can be greatly reduced, without gas being given off as in th case of the dull-black varnishes which are otherwise customary in the construction of optical instruments.

Excellent strength is obtained by using compacted ceramics in contradistinction to ordinary ceramics. The use of compacted ceramics is already known, for instance, for insulator and a prostheses. If the chassis or a part thereof is of constant cross section, it can be produced by the so-called extrusion process. In the case of more complicated shapes, so-called dry pressing may be used. The material can be worked easily in unfired condition; it is imparted its strength by the firing.

The advantages obtained by the invention consist not only in the good permanent stability, the very slight influence of temperature, and its low price due to low costs of material and simple machineability, but also in its good resistance to corrrosion, its good insulating capacity, and its low weight. One essential advantage, furthermore, is that the ceramic does not gasify, that is exhibits practically no aging phenomena and that its coefficient of thermal expansion can be adapted precisely to that of glass so that no mechanical stresses are produced between the chassis and the optical components mounted thereon upon variations in the surrounding temperature.

BRIEF DESCRIPTION OF THE DRAWINGS

The invention will be explained in further detail below with reference to exemplary embodiments illustrated in the drawings, in which.

DESCRIPTION OF THE PREFERRED EMBODIMENTS

Figure 1A:
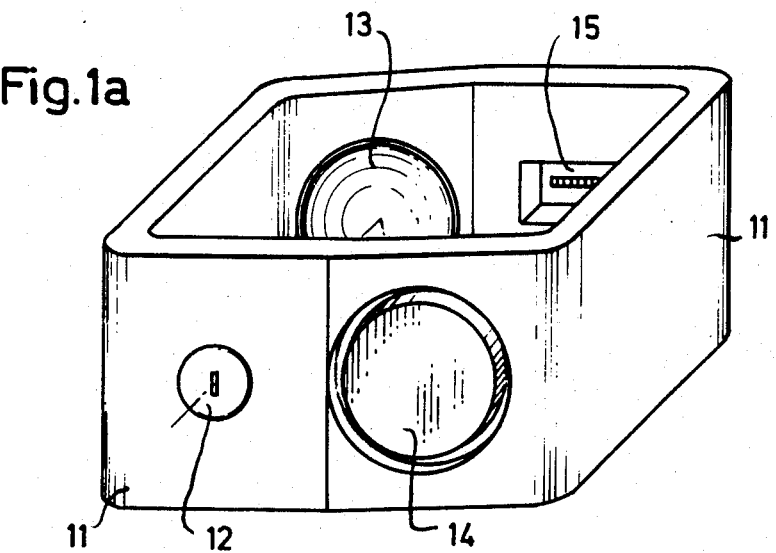
FIGS. 1a and 1b show a ceramic chassis for a spectrometer.
Figure 1B:
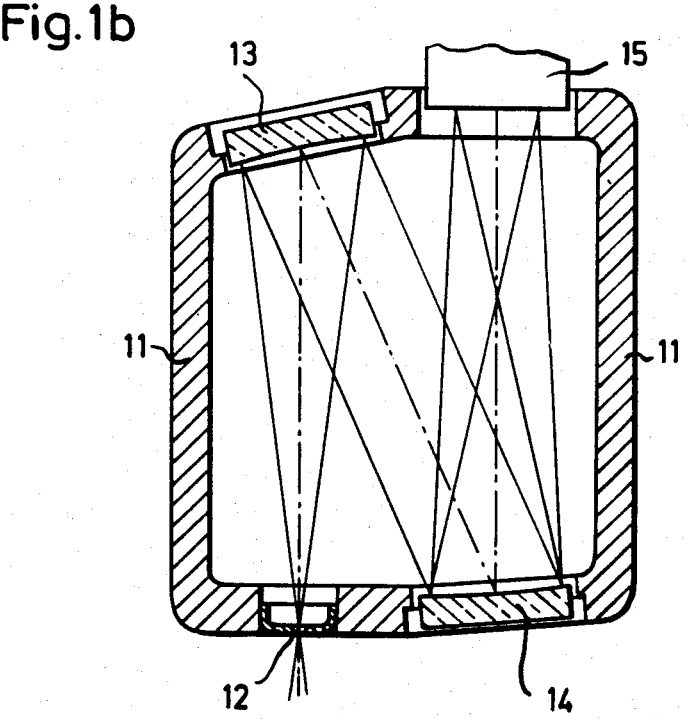

FIG. 1a shows in perspective a ceramic frame or housing 11 for a spectrometer. FIG. 1b is a section through the optical frame, taken in the optical plane, i. e., the plane of the optical axis. The spectrometer contains as optical components the entrance slit 12, a concave mirror 13, a grid 14, and a diode line 15 as receiver.

The ceramic chassis 11 may be produced by extrusion, but manufacture by dry pressing will result in greater precision. The entrance slit 12 consists of a cutout in a sheet metal part which can be bonded, for instance, directly into the ceramic member 11. The attachment of the other optical components can be effected, for instance, with a low-melting alloy, as described in the above-mentioned patent application. This type of attachment is particularly advantageous. The optical components may, however, of course also be fastened and adjusted in conventional manner.

Figure 2A:
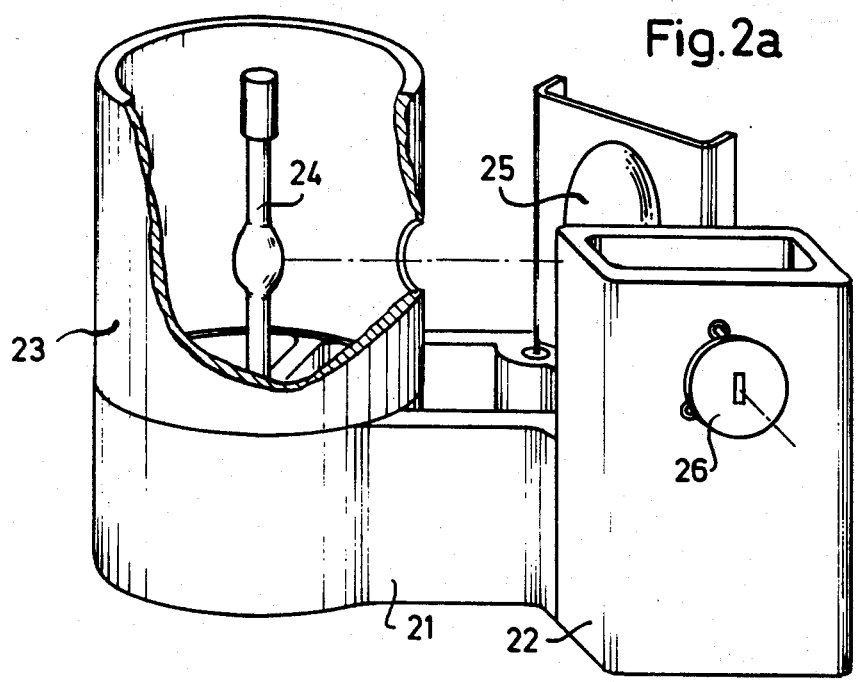
FIGS. 2a and 2b show a ceramic chassis for an illuminating device.
Figure 2B:
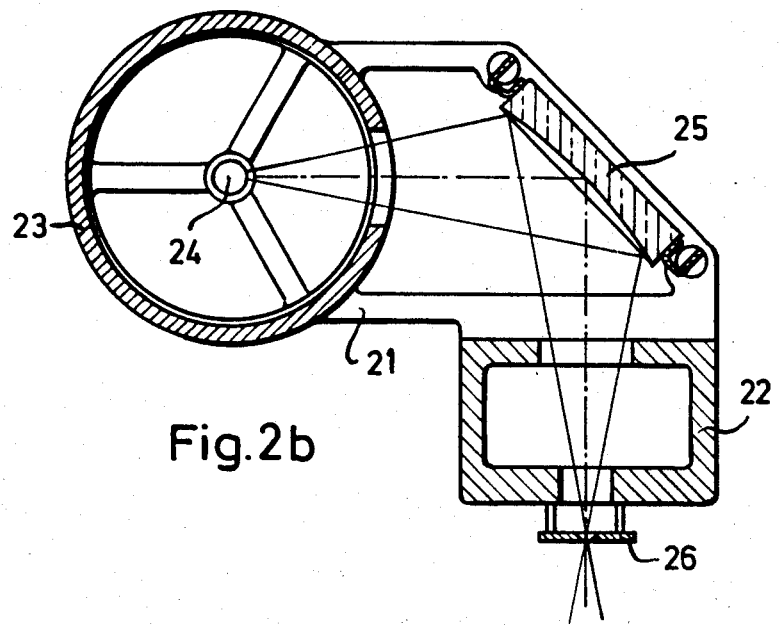

FIG. 2a shows, in perspective, an illuminating device such as used, for instance, for the spectrometer shown in FIGS. 1a and 1b. The chassis consists of the ceramic parts 21 and 22 which are either sintered together or held together by mechanical attachments. The cylinder 23 surrounding the xenon lamp 24 fastened in the part 21 may also consist of ceramic material but may also be of any other material. The elliptical concave mirror 25 and the exit diaphragm 26 are fastened to the parts 21 and 22 respectively in the same manner as described in further detail in the above-mentioned patent application. Here also a conventional attachment would be possible. FIG. 2b is a section taken in the optical plane. The ceramic part 21 is advisedly produced by dry pressing, and the ceramic part 22 by extrusion.

Figure 3:
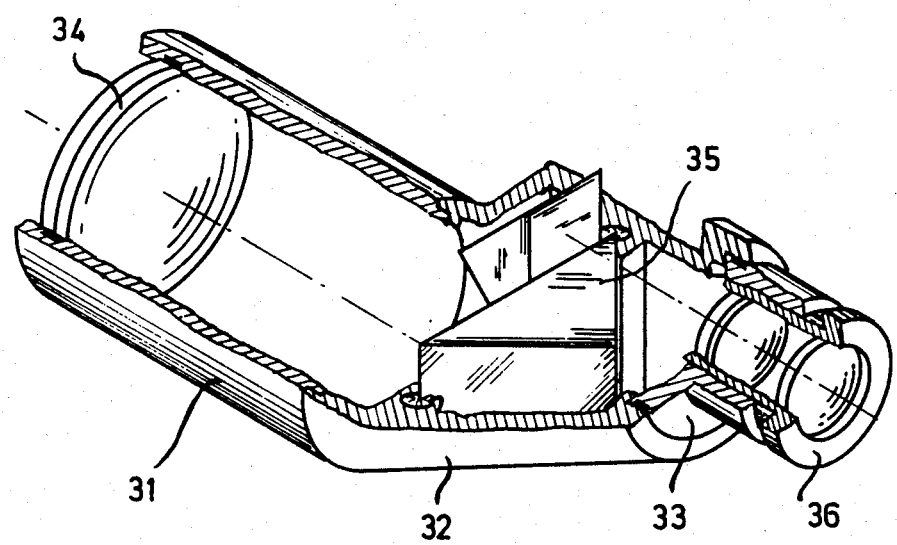
FIG. 3 shows a ceramic chassis for a prismatic telescope.

FIG. 3 shows, in perspective, one-half of a prismatic telescope, as an example of the development of the invention for other optical instruments. The optical elements, namely the objective 34, Porro prism 35, and eyepiece 36, are seated in a ceramic housing which consists of the parts 31, 32, and 33. The part 31 can be produced by extrusion, while the part 32 is dry-pressed. The two parts are advisedly sintered together. The part 33 is inserted only after the Porro prism has been inserted and adjusted. The part 33 may also consist, for instance, of metal or plastic. It has a thread (not shown) for focusing the eyepiece 36. It is particularly advantageous to adjust and fasten at least the lens 34 and the Porro prism 35 in the manner described in the above-mentioned patent application. However, it is also possible to use a conventional attachment.

The ceramic chassis is preferably covered with a coating (not shown) which gives to the prismatic telescope a pleasing and practical surface.

The term "compacted ceramic material" as used herein is intended in its technical sense understood in the art, meaning material which is purposely compacted under pressure as in a press or in extrusion apparatus. It does not refer to ceramic material compacted merely under its own weight. Compacted ceramic material is a polycrystalline material which is compacted to a density of more than 95% of the theorectical density of the monocrystalline material. In the following examples this corresponds to densities of about 3 grams per cubic centimeter, say from 2.8 grams to 3.3 grams per cubic centimeter, gives good results for purposes of the present invention, especially the following examples.

Thermal expansion characteristics of various ceramic materials are well known and well understood in the art. Once the present disclosure has been studied by a person skilled in the art, it will be within the skill of such person to select, for the chassis, appropriate ceramic materials having coefficients of thermal expansion closely matching those of the glass used for the optical elements mounted in the chassis. Such coefficients can be ascertained by consulting standard recognized reference publications such as (in the field of optical glass) the Schott glass catalog, and (in the field of ceramic materials) the ceramic catalog of Rosenthal Technik AG.

The following specific examples are given.

EXAMPLE 1

The ceramic chassis is made of the ceramic material known as "Frequenta", which is material KER 221 in the Rosenthal ceramics catalog. The optical elements mounted in this ceramic chassis are made of the glass known as ZKN 7 in the Schott glass catalog.

This "Frequenta" ceramic material is composed essentially of
- 58.5% $SiO_2$
- 25.7% MgO
- 6.3% BaO
- 4.0% $ZrO_2$
- 2.9% $Al_2O_3$ (balance impurities in raw materials)

It is compacted to a density of from 2.8 to 2.9 grams per cubic centimeter, and is burned (heated) at a temperature of 1300 to 1320 degrees Centigrade for a time of 48 to 96 hours.

The coefficient of thermal expansion of this ceramic chassis, in its completed state, is $50 \times 10^{-7}$ per degree K. The coefficient of thermal expansion of the Schott glass ZKN 7 used for the optical elements mounted in this chassis is $49 \times 10^{-7}$ per degree K, which is a close match to the coefficient of the ceramic material.

EXAMPLE 2

The ceramic chassis is made of an aluminum oxide ceramic material identified in the Rosenthal ceramic catalog as KER 706, and the optical elements mounted in this ceramic chassis are made of the glass identified in the Schott glass catalog as BK 3.

This ceramic material is composed essentially of
- 78.0% $Al_2O_3$
- 16.6% $SiO_2$
- 0.66% MgO
- 2.1% $K_2O$
- 1.2% $Na_2O$ (balance impurities in raw materials)

It is compacted to a density of from 3.1 to 3.3 grams per cubic centimeter, and is burned at a temperature of 1300 to 1340 degrees Centigrade for a time of 48 to 96 hours.

The coefficient of thermal expansion of this ceramic chassis, in its completed state, is 60 (times $10^{-7}$ per degree K, which is to be understood in connection with all coefficients of thermal expansion hereafter stated). The coefficient of thermal expansion of the Schott glass BK 3 which is used in this example, is 59, which is a close match to the 60 coefficient of the chassis.

EXAMPLE 3

In this example, the ceramic chassis is made of the same material as in Example 2. The glass used for the optical elements in the glass designated in the Schott glass catalog as KzF 6. The coefficient of thermal expansion of this glass is 59, which again is a close match to the coefficient of the ceramic material of the chassis, which is 60.

OTHER EXAMPLES

It may be noted here that in a ceramic material of the high alumina type as used in Example 2, the coefficient of thermal expansion increases with an increase in the percentage of alumina, from a coefficient of 60 when using 78% of alumina, as in Example 2, to a coefficient of 70 when the mixture is 98% of alumina. By taking advantage of this possibility of varying the coefficient of thermal expansion of the ceramic chassis by varying the proportion of alumina in the ceramic, one is able to utilize a wider selection of glasses for the optical elemetns to be mounted in the chassis. For example, the following Schott glasses have the following respective coefficients of thermal expansion.

| Glass SK 5 | coefficient | 63 |
| --- | --- | --- |
| BaF 9 | | 64 |
| SK 2 | | 66 |

If any of these glasse are more suitable for a particular optical purpose, than the glasses specifically identified in foregoing examples 1, 2, and 3, the designer of the appratus is free to use the desired glass, since he can vary the amount of alumina in the ceramic mixture from which the chassis is made, to match the coefficient of thermal expansion of the chassis closely to that of the most suitable glass, thereby maximizing the firm mounting of the optical elements in the chassis over a long period of time, and minimizing possible cracking, breakage, or looseness which might be caused by temperature changes if tightly contacting parts (ceramic chassis and glass optical element) had substantially different coefficients of thermal expansion.

What is claimed is:

1. A chassis for optical instruments for the permanent, precise holding of optical components, characterized by the fact that the chassis is formed of compacted ceramic material compacted to a density of not less than 95% of a theoretical density of a monocrystalline material.

2. The invention defined in claim 1, comprising an optical element formed of optical glass and mounted on said ceramic chassis, said optical glas shaving a coefficient of thermal expansion approximately equal to the coefficient of thermal expansion of said compacted ceramic material from which said chassis is made.

3. The invention defined in claim 1, wherein said chassis is formed as a three-dimensional torsionally-resistant hollow structure.

4. The invention defined in claim 1, wherein said chassis comprises a plurality of individual parts of compacted ceramic material, sintered together to form an indissoluble structure.

5. The invention defined in claim 1, wherein said chassis comprises a plurality of individual parts of compacted ceramic material, detachably connected to each other.

6. The invention defined in claim 1, wherein said compacted ceramic material is provided with threaded holes for fastening optical components to said chassis.

7. The invention defined in claim 1, wherein said compacted ceramic material is provided with hollow spaces for receptionof fastening means for fastening optical components to said chassis.

8. The invention defined in claim 1, wherein said compacted ceramic material is formed with grooves for reception of fastening means for fastening optical components to said chassis.

9. An optical instrument comprising a first optical element made of optical glass, a second optical element also made of optical glass and psotioned to receive light from said first element, and a chassis for holding said first and second elements in rigid fixed position relative to each other, said chassis being formed of compacted ceramic material compacted to a density of not less than about 2.8 grams per cubic centimeter and having a coefficient of thermal expansion approximately equal to the coefficients of thermal expansion of the glasses from which both of said optical elements are made.

10. The method of maintaining a plurality of optical elements in precisely defined positions relative to each other over relatively long periods of time and minimizing possibility of shifting of such elements relative to each other as a result of stresses caused by repeated temperature changes during said long periods of time, which comprises the steps of:

(a) selecting a suitable optical glass to use for making at least one of said optical elements, from among available optical glasses having coefficients of thermal expansion in the range of about 50 to 70 times $10^{-7}$ per degree K;

(b) making said one of said optical elements from the selected glass;

(c) selecting a dense compacted ceramic material having a coefficient of thermal expansion relatively close to that of the selected glass;

(d) making a mounting chassis from the selected dense compacted ceramic material; and (e) mounting said optical elements, including said one of said optical elements made from the selected glass, in permanent location on said chassis in precisely defined position relative to each other;

(f) whereby the inherent stability of the densely compacted ceramic material of the chassis plus the close match of the coefficient of thermal expansion of the ceramic material of the chassis to the coefficient of thermal expansion of the glass of at least one of the optical elements mounted on the chassis will minimize risk of shifting or breakage of said one of said optical elements as a result of fluctuations of temperature during long intervals of time.

11. A chassis for optical instruments for the permanent, precise holding of optical components, characterized by the fact that the chassis is formed of compacted ceramic material compacted to a density of not less than substantially 2.8 grams per cubic centimeter.

* * * * *